United States Patent
Kaneko

(10) Patent No.: US 11,607,926 B2
(45) Date of Patent: Mar. 21, 2023

(54) VEHICULAR AIR CONDITIONING SYSTEM

(71) Applicant: SANDEN HOLDINGS CORPORATION, Gunma (JP)

(72) Inventor: Akira Kaneko, Gunma (JP)

(73) Assignee: SANDEN HOLDINGS CORPORATION, Gunma (JP)

( * ) Notice: Subject to any disclaimer, the term of this patent is extended or adjusted under 35 U.S.C. 154(b) by 80 days.

(21) Appl. No.: 17/274,329

(22) PCT Filed: Aug. 23, 2019

(86) PCT No.: PCT/JP2019/032955
§ 371 (c)(1),
(2) Date: Mar. 8, 2021

(87) PCT Pub. No.: WO2020/059417
PCT Pub. Date: Mar. 26, 2020

(65) Prior Publication Data
US 2021/0323379 A1  Oct. 21, 2021

(30) Foreign Application Priority Data
Sep. 21, 2018 (JP) .............................. JP2018-177280

(51) Int. Cl.
*F25B 13/00* (2006.01)
*B60H 1/00* (2006.01)

(52) U.S. Cl.
CPC ............ *B60H 1/00921* (2013.01); *B60H 2001/00928* (2013.01); *B60H 2001/00949* (2013.01)

(58) Field of Classification Search
CPC ...... B60H 1/00921; B60H 2001/00928; B60H 2001/00949
(Continued)

(56) References Cited

U.S. PATENT DOCUMENTS

| 6,092,383 A | 7/2000 | Moteur |
| 2011/0197611 A1 | 8/2011 | Hall |

(Continued)

FOREIGN PATENT DOCUMENTS

| JP | H0692136 | * | 4/1994 |
| JP | H09-169207 A | | 6/1997 |

(Continued)

OTHER PUBLICATIONS

International Search Report dated Oct. 8, 2019 issued in Patent Application No. PCT/JP2019/032955.

*Primary Examiner* — Davis D Hwu
(74) *Attorney, Agent, or Firm* — Pearne & Gordon, LLP

(57) ABSTRACT

Provided is a vehicle air-conditioning system configured so that air-cooling/heating can be efficiently performed. The system (10, 20, 30, 40) includes a vapor compression heat pump unit (HP) having at least a compressor (CP), a condenser (CD), an expansion mechanism (EX), and an evaporator (EV) on a refrigerant circuit (RC), a brine flow path network (BC) having multiple pumps (PC, PH) and multiple flow path switching valves (TV1 to TV8, V1 to V9), and a vehicle indoor air-conditioning unit (AC) having an air duct (AD) and multiple vehicle indoor heat exchangers (HXC1, HXC2) arranged in series in the air duct. Upon actuation in an air-cooling mode or an air-heating mode accompanied by neither dehumidification nor defrosting, brine flows in series in the multiple vehicle indoor heat exchangers.

3 Claims, 10 Drawing Sheets

(58) Field of Classification Search
USPC .......................................................... 62/160
See application file for complete search history.

(56) References Cited

U.S. PATENT DOCUMENTS

2017/0197490 A1   7/2017   Enomoto et al.
2019/0143793 A1   5/2019   Marasigan et al.

FOREIGN PATENT DOCUMENTS

| JP | H11-301254 A | 11/1999 |
| JP | 2001-500822 A | 1/2001 |
| JP | 2004-175265 A | 6/2004 |
| JP | 2012-505796 A | 3/2012 |
| JP | 2016-003828 A | 1/2016 |
| JP | 2018-020762 A | 2/2018 |
| WO | 2015-194107 A1 | 12/2015 |

* cited by examiner

VEHICULAR AIR CONDITIONING SYSTEM

TECHNICAL FIELD

The present invention relates to a vehicle air-conditioning system, and specifically relates to a vehicle air-conditioning system configured such that brine (a heat medium) heated or cooled by heat exchange with refrigerant in a vapor compression heat pump is used as a heating source or a cooling source of air sent into a vehicle compartment and air-heating and air-cooling are efficiently performed.

BACKGROUND ART

As a vehicle air-conditioning system, one using a vapor compression heat pump has been known.

The heat pump in such an air-conditioning system includes, on a circuit in which refrigerant circulates, a compressor, vehicle indoor heat exchangers, an expansion mechanism, and a vehicle outdoor heat exchanger. Normally, two vehicle indoor heat exchangers are arranged in series in an air flow direction in an air duct for sucking air outside or inside a vehicle compartment to send the temperature-adjusted air into the vehicle compartment.

In air-cooling operation, high-temperature high-pressure refrigerant discharged from the compressor flows into the vehicle outdoor heat exchanger, and releases heat (is condensed). Thereafter, the refrigerant normally flows into the first vehicle indoor heat exchanger arranged at an upstream-side location in the air duct through the expansion mechanism, and absorbs heat (is evaporated). Thereafter, the refrigerant flows back to the compressor. Air sucked into the air duct is cooled by heat absorption by the refrigerant in the first vehicle indoor heat exchanger, and the low-temperature air is sent into the vehicle compartment.

In air-heating operation, high-temperature high-pressure refrigerant discharged from the compressor normally flows into the second vehicle indoor heat exchanger arranged at a downstream-side location in the air duct, and releases heat (is condensed). Thereafter, the refrigerant flows into the vehicle outdoor heat exchanger through the expansion mechanism, and absorbs heat (is evaporated). Thereafter, the refrigerant flows back to the compressor. Air sucked into the air duct is heated by heat absorption from the refrigerant in the second vehicle indoor heat exchanger, and the high-temperature air is sent into the vehicle compartment.

Air is cooled to equal to or lower than a dew-point temperature by means of heat absorption action of the first vehicle indoor heat exchanger, and in this manner, contained moisture is condensed and removed. That is, the air can be dehumidified. At this point, the air at a low temperature of equal to or lower than the dew-point temperature is heated as necessary by means of heat release action of the second vehicle indoor heat exchanger, and in this manner, the dehumidified air at a proper temperature can be sent into the vehicle compartment. That is, in the air-conditioning system described above, dehumidification air-cooling operation and dehumidification air-heating operation can be also performed using a combination of the heat absorption action of the first vehicle indoor heat exchanger and the heat release action of the second vehicle indoor heat exchanger.

In the air-conditioning system configured as described above, the refrigerant circuit of the heat pump is switched using electromagnetic valves, and in this manner, an operation mode (air-cooling, air-heating, dehumidification air-cooling, dehumidification air-heating and the like) is switched.

However, in this air-conditioning system, the refrigerant circuit of the heat pump is complicated, and complicated control for switching the operation mode is necessary. As a result of the complicated refrigerant circuit, the total length of the refrigerant circuit is long. This leads to a great required refrigerant filling amount and a weight increase. In addition, a refrigerant circuit pressure loss is great, leading to performance degradation.

For solving such a problem, a vehicle air-conditioning system has been proposed, which is configured such that heating or cooling of air sent into a vehicle compartment is performed by brine (a heat medium) heated or cooled by heat exchange with refrigerant in a heat pump instead of performing heating or cooling by refrigerant in the heat pump (see, e.g., Patent Literature 1).

The vehicle air-conditioning system of Patent Literature 1 includes a refrigerant circuit (a refrigerant circuit 20) of a vapor compression heat pump and a circuit in which coolant water as brine flows.

In this air-conditioning system, in air-cooling operation, coolant water flowing in a low-temperature-side coolant water circuit C1 is cooled in an evaporator (a coolant water cooler 14) of the heat pump, and thereafter, is supplied to a cooler (a cooler core 16) of an indoor air-conditioning unit 26. On the other hand, in air-heating operation, coolant water flowing in a high-temperature-side coolant water circuit C2 is heated in a condenser (a coolant water heater 15) of the heat pump, and thereafter, is supplied to a radiator (a heater core 17) of the indoor air-conditioning unit 26.

CITATION LIST

Patent Literature

PATENT LITERATURE 1: JP-A-2016-3828

SUMMARY OF THE INVENTION

Problems to be Solved by the Invention

In the air-conditioning system of Patent Literature 1, the indoor air-conditioning unit 26 includes two heat exchangers (the cooler core 16 and the heater core 17), but only the cooler core 16 is used for air cooling in the air-cooling operation and only the heater core 17 is used for air heating in the air-heating operation. That is, in any of the air-cooling operation and the air-heating operation, only one of two heat exchangers contributes to heat exchange, and the other heat exchanger does not contribute to heat exchange. For this reason, it can be said that the air-conditioning system of Patent Literature 1 has room to improve, considering air-cooling and air-heating efficiencies.

The present invention has been made in view of these problems, and is intended to provide a vehicle air-conditioning system configured such that brine (a heat medium) heated or cooled by heat exchange with refrigerant in a vapor compression heat pump is used as a heating source or a cooling source of air sent into a vehicle compartment and air-heating and air-cooling are more efficiently performed.

Solution to the Problems

For solving the above-described problems, the vehicle air-conditioning system of the present invention includes a vapor compression heat pump unit having at least a compressor, a condenser, an expansion mechanism, and an evaporator on a circuit in which refrigerant flows, a heat medium flow path network having multiple pumps and multiple flow path switching valves and configured such that a heat medium flows in the heat medium flow path network, and a vehicle indoor air-conditioning unit having an air duct and multiple vehicle indoor heat exchangers arranged in series in an air flow direction in the air duct and configured to heat or cool air. The heat medium in the heat medium flow path network exchanges heat with the refrigerant in each of the condenser and the evaporator, the air in each of the multiple vehicle indoor heat exchangers, and vehicle outdoor air in a vehicle outdoor heat exchanger. When the vehicle air-conditioning system is actuated in an air-cooling mode or an air-heating mode accompanied by neither dehumidification nor defrosting, the heat medium flows in series in the multiple vehicle indoor heat exchangers.

Preferably, during operation of the vehicle air-conditioning system, a high-temperature heat medium circuit and a low-temperature heat medium circuit of which paths are different according to an operation mode by setting of the multiple flow path switching valves are formed on the heat medium flow path network. The heat medium circulating in the high-temperature heat medium circuit is heated by the refrigerant in the condenser, and thereafter, is sent to the high-temperature heat medium circuit by a high-temperature-side pump. The heat medium circulating in the low-temperature heat medium circuit is cooled by the refrigerant in the evaporator, and thereafter, is sent to the low-temperature heat medium circuit by a low-temperature-side pump.

Preferably, a high-temperature-side buffer tank is provided on an upstream side of the condenser on the high-temperature heat medium circuit. A low-temperature-side buffer tank is provided on an upstream side of the evaporator on the low-temperature heat medium circuit. When the vehicle air-conditioning system is operated in an air-heating mode, the heat medium can be transferred from the low-temperature heat medium circuit to the high-temperature heat medium circuit by setting of the multiple flow path switching valves. When the vehicle air-conditioning system is operated in an air-cooling mode, the heat medium can be transferred from the high-temperature heat medium circuit to the low-temperature heat medium circuit by setting of the multiple flow path switching valves.

Preferably, the vehicle air-conditioning system is configured such that the heat medium flowing in the heat medium flow path network can absorb heat from a vehicle-side heat source or release heat to the vehicle-side heat source.

Effects of the Invention

According to the vehicle air-conditioning system of the present invention, the high-temperature heat medium flows in series in the multiple vehicle indoor heat exchangers in the air-heating mode, and the low-temperature heat medium flows in series in the multiple vehicle indoor heat exchangers in the air-cooling mode. Thus, air-heating and air-cooling can be efficiently performed.

DESCRIPTION OF THE EMBODIMENTS

Hereinafter, embodiments of the present invention will be described in detail with reference to the drawings.

Figure 1:
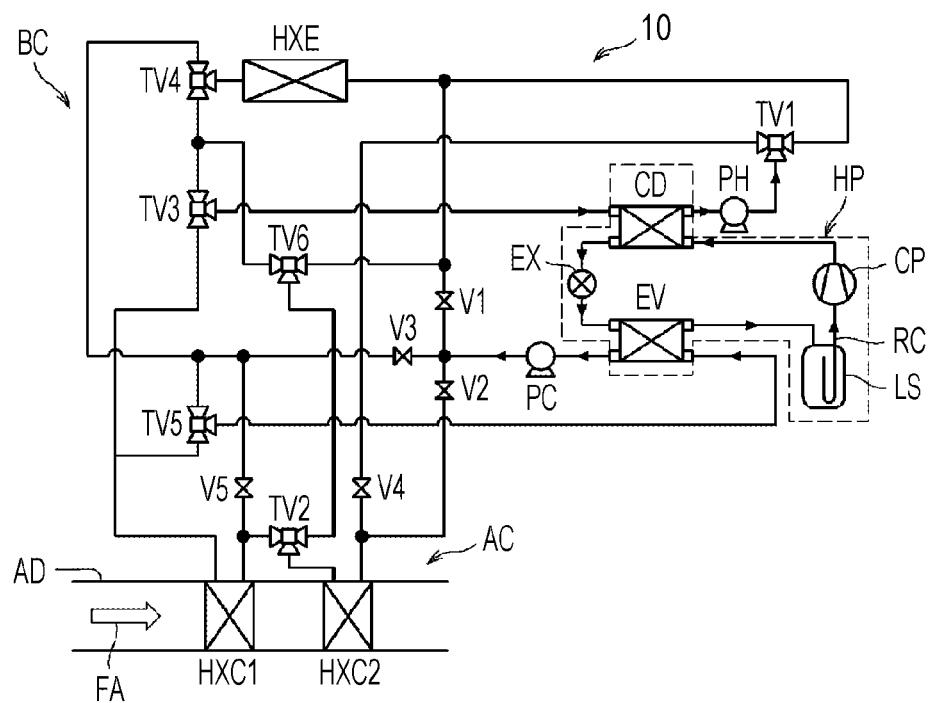
FIG. 1 illustrates a conceptual diagram for describing an entire configuration of a vehicle air-conditioning system of a first embodiment of the present invention.

FIG. 1 illustrates a schematic diagram for describing an entire configuration of a vehicle air-conditioning system 10 of a first embodiment of the present invention.

As illustrated in FIG. 1, the vehicle air-conditioning system 10 includes a vapor compression heat pump unit HP, a vehicle indoor air-conditioning unit AC, and a brine flow path network BC.

The vapor compression heat pump unit HP includes, on a refrigerant circuit RC in which refrigerant flows, a compressor CP, a condenser CD, an expansion mechanism EX, an evaporator EV, and a liquid reservoir LS.

As described later, the condenser CD is configured such that heat is exchanged between refrigerant in the heat pump unit HP and brine flowing in the brine flow path network BC.

As a result, in the condenser CD, the brine flowing in the brine flow path network BC is heated by condensation heat released upon condensation of the refrigerant in the heat pump unit HP.

Similarly, the evaporator EV is also configured such that heat is exchanged between refrigerant in the heat pump unit HP and brine flowing in the brine flow path network BC. As a result, in the evaporator EV, the brine flowing in the brine flow path network BC is cooled by evaporation heat absorbed upon evaporation of the refrigerant in the heat pump unit HP.

The expansion mechanism EX is a mechanism configured to isenthalpically expand refrigerant flowing out of the condenser CD, and can be an electronic expansion valve, a temperature type automatic expansion valve, a fixed orifice, a capillary tube or the like.

During operation of the heat pump unit HP, refrigerant discharged from the compressor CP flows into the condenser CD and is condensed. Thereafter, the refrigerant flows into the evaporator EV through the expansion mechanism EX, and is evaporated. Thereafter, the refrigerant flows back to the compressor CP through the liquid reservoir LS.

Note that in FIG. 1, the liquid reservoir LS is arranged between the evaporator EV and the compressor CP and is used as an accumulator. However, the liquid reservoir LS may be arranged between the condenser CD and the expansion mechanism EX and be used as a receiver, or the liquid reservoirs LS may be arranged at both of the above-described two positions.

Although not shown in FIG. 1, an internal heat exchanger configured to exchange heat between high-pressure-side refrigerant and low-pressure-side refrigerant flowing in the refrigerant circuit RC may be provided.

Note that the components (the compressor CP, the condenser CD, the expansion mechanism EX, the evaporator EV, the liquid reservoir LS, and the refrigerant circuit RC) of the heat pump unit HP are configured as an integrated unit (see a dashed line in the figure). Thus, each of the condenser CD and the evaporator EV is disconnected from a flow path of the brine flow path network BC so that the heat pump unit HP can be easily detached from the vehicle air-conditioning system 10. Consequently, maintenance of the heat pump unit HP can be easily performed.

The vehicle indoor air-conditioning unit AC includes an air duct AD configured to suck air outside or inside a vehicle compartment by a fan (not shown) to send the temperature-adjusted air into the vehicle compartment and a first vehicle indoor heat exchanger HXC1 and a second vehicle indoor heat exchanger HXC2 arranged in the air duct AD. In the air duct AD, the first vehicle indoor heat exchanger HXC1 is, in an air flow direction indicated by an arrow FA, arranged on an upstream side with respect to the second vehicle indoor heat exchanger HXC2.

The brine flow path network (a heat medium flow path network) BC is a flow path network in which brine (a heat medium) for heating or cooling air flowing in the air duct AD in the first vehicle indoor heat exchanger HXC1 and the second vehicle indoor heat exchanger HXC2 of the vehicle indoor air-conditioning unit AC flows. As the brine described herein, an antifreeze such as ethylene glycol can be used. However, in the case of use only in environment where an external air temperature does not reach equal to or lower than a freezing point, water can be also used.

Note that the amount of brine filling the brine flow path network BC may be determined so that an air-heating or air-cooling effect can be maintained for desired time by a heat storage amount or cold storage amount of brine even in a case where the compressor CP of the heat pump unit HP is stopped upon, e.g., stop of a vehicle.

A high-temperature-side pump PH, a low-temperature-side pump PC, a vehicle outdoor heat exchanger HXE, and multiple three-way valves (TV1 to TV6) and multiple on-off valves (V1 to V5) configured as electromagnetic valves are arranged on the brine flow path network BC (the three-way valves and the on-off valves will be also referred to as flow path switching valves in the present specification). Alternatively, the electromagnetic valves and the on-off valves as described above may be modularized combination valves.

The high-temperature-side pump PH is arranged on a brine outlet side of the condenser CD of the heat pump unit HP, and has the function of sending, to the brine flow path network BC, brine heated by condensation heat of refrigerant in the condenser CD. Note that the high-temperature-side pump PH may be placed at any location as long as such a location is before or after the condenser CD and before branching of the brine flow path.

The low-temperature-side pump PC is arranged on a brine outlet side of the evaporator EV of the heat pump unit HP, and has the function of sending, to the brine flow path network BC, brine cooled by evaporation heat of refrigerant in the evaporator EV. Note that the low-temperature-side pump PC may be placed at any location as long as such a location is before or after the evaporator EV and before branching of the brine flow path.

The vehicle outdoor heat exchanger HXE is, for example, placed at a front surface of the vehicle, and is configured such that heat is exchanged between brine and air flowing in from the outside of the vehicle compartment by a fan (not shown) or naturally according to the speed of the vehicle while the vehicle is running. In a case where the same material as a cooling medium for an engine of the vehicle is used as brine, the common vehicle outdoor heat exchanger HXE can be also used as a radiator for the cooling medium.

Note that in the vehicle outdoor heat exchanger HXE, the flow rate of inflow air increases as the vehicle speed increases, and heat exchange between air outside the vehicle compartment and brine is efficiently performed. Thus, in the case of a high vehicle speed, the compressor CP of the heat pump unit HP is preferably rotated at as high speed as possible to increase the heat storage amount or cold storage amount of brine. Conversely, in the case of a low vehicle speed, the compressor CP of the heat pump unit HP is preferably rotated at as low speed as possible or is preferably stopped for reducing energy consumption.

Figure 2:
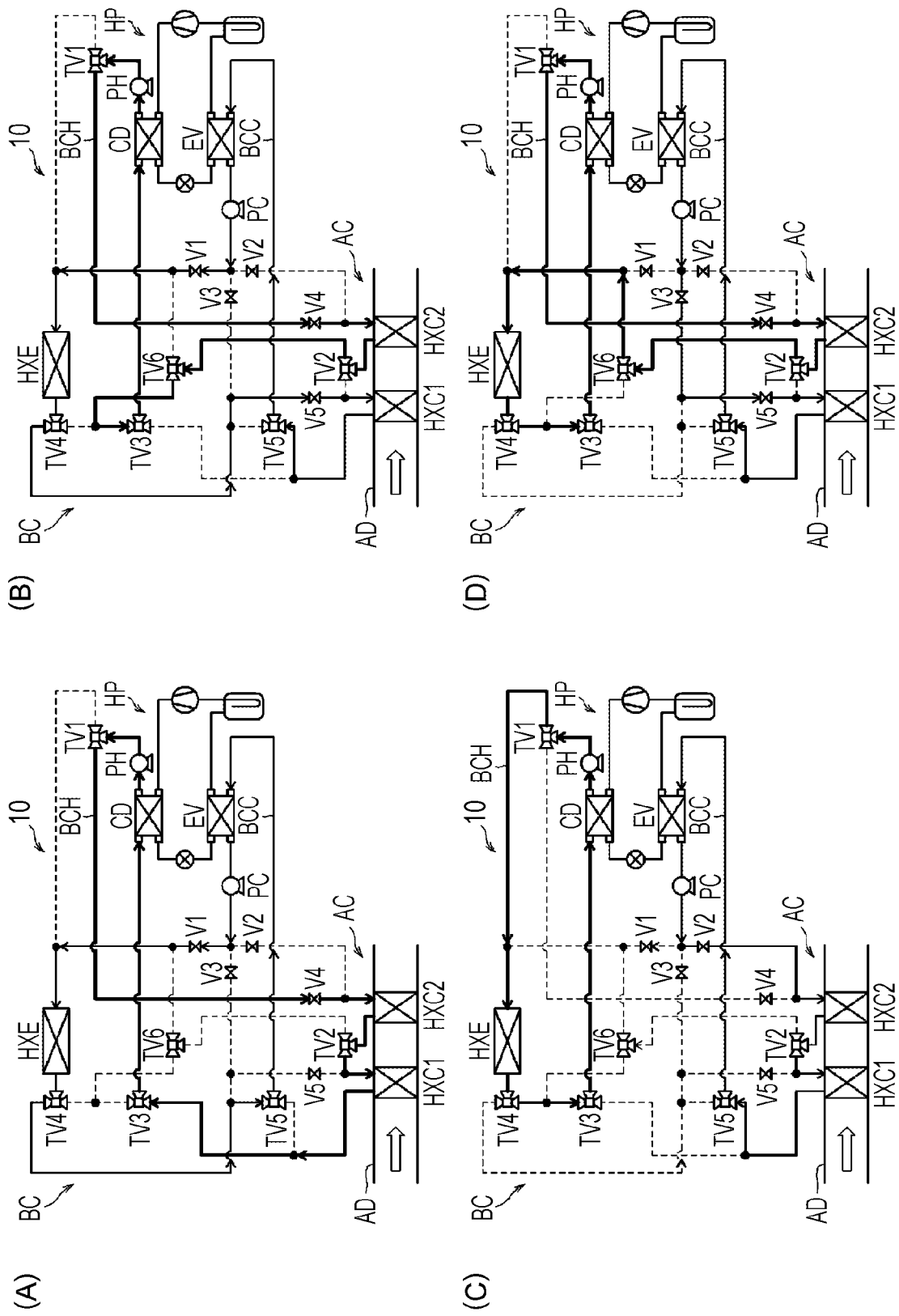
FIG. 2 illustrates conceptual diagrams for describing the flow of brine in each operation mode of the vehicle air-conditioning system of the first embodiment of the present invention, FIG. 2(A) illustrating an air-heating mode, FIG. 2(B) illustrating a dehumidification air-heating mode, FIG. 2(C) illustrating an air-cooling mode, and FIG. 2(D) illustrating a dehumidification air-cooling mode and a defrosting mode.

In the brine flow path network BC, the above-described multiple flow path switching valves are controlled as necessary, and in this manner, a high-temperature brine circuit (a high-temperature heat medium circuit) BCH in which high-temperature brine sent out by the high-temperature-side pump PH circulates and a low-temperature brine circuit (a low-temperature heat medium circuit) BCC in which low-temperature brine sent out by the low-temperature-side pump PC circulates are formed in each operation mode described later (see FIG. 2).

The vehicle air-conditioning system 10 configured as described above controls, as necessary, the multiple flow path switching valves arranged on the brine flow path network BC to form the high-temperature brine circuit BCH and the low-temperature brine circuit BCC in each mode, thereby performing operation in five operation modes (an air-heating mode, a dehumidification air-heating mode, an air-cooling mode, a dehumidification air-cooling mode, and a defrosting mode).

FIG. 2 illustrates schematic diagrams for describing the flow of brine in each operation mode of the vehicle air-conditioning system 10. FIG. 2(A) illustrating the air-heating mode, FIG. 2(B) illustrating the dehumidification air-heating mode, FIG. 2(C) illustrating the air-cooling mode, and FIG. 2(D) illustrating the dehumidification air-cooling mode and the defrosting mode.

In the air-heating mode, the on-off valves V1, V4 are opened, and on the other hand, the on-off valves V2, V3, V5 are closed, as illustrated in FIG. 2(A).

As a result, brine circulating in the high-temperature brine circuit BCH flows into the second vehicle indoor heat exchanger HXC2 from the high-temperature-side pump PH sequentially through the three-way valve TV1 and the on-off valve V4, and further flows into the first vehicle indoor heat exchanger HXC1 through the three-way valve TV2.

At this point, the brine passing sequentially through the second vehicle indoor heat exchanger HXC2 and the first vehicle indoor heat exchanger HXC1 sequentially heats air flowing in the air duct AD.

The brine having flowed out of the first vehicle indoor heat exchanger HXC1 flows into the condenser CD of the heat pump unit HP through the three-way valve TV3. After having been heated by condensation heat of refrigerant, the brine flows out of the condenser CD, and flows back to the high-temperature-side pump PH.

Meanwhile, brine circulating in the low-temperature brine circuit BCC flows into the vehicle outdoor heat exchanger HXE from the low-temperature-side pump PC through the on-off valve V1, and absorbs heat from air outside the vehicle compartment. Thereafter, the brine having flowed out of the vehicle outdoor heat exchanger HXE flows into the evaporator EV of the heat pump unit HP sequentially through the three-way valve TV4 and the three-way valve TV5. After having been cooled by evaporation heat of refrigerant, the brine flows out of the evaporator EV, and flows back to the low-temperature-side pump PC.

As described above, in the air-heating mode, high-temperature brine first flows through the second vehicle indoor heat exchanger HXC2 arranged at a downstream-side location in the air duct AD, and subsequently flows through the first vehicle indoor heat exchanger HXC1 arranged at an upstream-side location in the air duct AD. Thus, heat exchange between brine and air is of a so-called counter-current type. In any heat exchanger, a great temperature difference between brine and air can be ensured, and therefore, heating of air, i.e., air-heating, can be efficiently performed.

Note that in a case where the temperature of brine circulating in the high-temperature brine circuit BCH is a low temperature equal to that of air outside the vehicle compartment, such as right after the engine (or an electric drive system) of the vehicle has been started during the winter time, the compressor CP of the heat pump unit HP is preferably rotated at as high speed as possible for accelerating an increase in the brine temperature. Note that in a case where noise of the compressor CP provides an uncomfortable feeling in the vehicle compartment specifically at a low vehicle speed, the upper limit of the number of rotations of the compressor CP may be set.

On the other hand, in a case where the temperature of brine circulating in the high-temperature brine circuit BCH has increased to equal to or higher than a predetermined lower temperature limit (such a temperature that the air-heating effect can be maintained for the desired time by the heat storage amount of brine), the compressor CP of the heat pump unit HP may be stopped upon idling of the vehicle for reducing energy consumption.

The same control mode of the compressor CP of the heat pump unit HP as described above also applies to the dehumidification air-heating mode described next and an air-heating mode and a dehumidification air-heating mode in vehicle air-conditioning systems of other embodiments described later.

In the dehumidification air-heating mode, the on-off valves V1, V4, V5 are opened, and on the other hand, the on-off valves V2, V3 are closed, as illustrated in FIG. 2(B).

As a result, brine circulating in the high-temperature brine circuit BCH flows into the second vehicle indoor heat exchanger HXC2 from the high-temperature-side pump PH sequentially through the three-way valve TV1 and the on-off valve V4, and heats air flowing in the air duct AD.

The brine having flowed out of the second vehicle indoor heat exchanger HXC2 flows into the condenser CD of the heat pump unit HP sequentially through the three-way valve TV2, the three-way valve TV6, and the three-way valve TV3. After having been heated by condensation heat of refrigerant, the brine flows out of the condenser CD, and flows back to the high-temperature-side pump PH.

Meanwhile, brine circulating in the low-temperature brine circuit BCC flows into the vehicle outdoor heat exchanger HXE from the low-temperature-side pump PC through the on-off valve V1, and absorbs heat from air outside the vehicle compartment. Thereafter, the brine having flowed out of the vehicle outdoor heat exchanger HXE flows into the first vehicle indoor heat exchanger HXC1 sequentially through the three-way valve TV4 and the on-off valve V5, and cools air flowing in the air duct AD. At this point, the air in the air duct AD is cooled to equal to or lower than a dew-point temperature, and therefore, contained moisture is condensed and removed and the air is dehumidified.

Thereafter, the brine having flowed out of the first vehicle indoor heat exchanger HXC1 flows into the evaporator EV of the heat pump unit HP through the three-way valve TV5. After having been cooled by evaporation heat of refrigerant, the brine flows out of the evaporator EV, and flows back to the low-temperature-side pump PC.

As described above, air flowing in the air duct AD is dehumidified in the first vehicle indoor heat exchanger HXC1 through which low-temperature brine passes, and thereafter, is heated to a desired temperature in the second vehicle indoor heat exchanger HXC2 through which high-temperature brine passes. In this manner, dehumidification air-heating is performed.

In the air-cooling mode, the on-off valve V2 is opened, and on the other hand, the on-off valves V1, V3 to V5 are closed, as illustrated in FIG. 2(C).

As a result, brine circulating in the low-temperature brine circuit BCC flows into the second vehicle indoor heat exchanger HXC2 from the low-temperature-side pump PC through the on-off valve V2, and further flows into the first vehicle indoor heat exchanger HXC1 through the three-way valve TV2.

At this point, the brine passing sequentially through the second vehicle indoor heat exchanger HXC2 and the first vehicle indoor heat exchanger HXC1 sequentially cools air flowing in the air duct AD.

The brine having flowed out of the first vehicle indoor heat exchanger HXC1 flows into the evaporator EV of the heat pump unit HP through the three-way valve TV5. After having been cooled by evaporation heat of refrigerant, the brine flows out of the evaporator EV, and flows back to the low-temperature-side pump PC.

Meanwhile, brine circulating in the high-temperature brine circuit BCH flows into the vehicle outdoor heat exchanger HXE from the high-temperature-side pump PH through the three-way valve TV1, and releases heat to air outside the vehicle compartment. Thereafter, the brine having flowed out of the vehicle outdoor heat exchanger HXE flows into the condenser CD of the heat pump unit HP sequentially through the three-way valve TV4 and the three-way valve TV3. After having been heated by condensation heat of refrigerant, the brine flows out of the condenser CD, and flows back to the high-temperature-side pump PH.

As described above, in the air-cooling mode, low-temperature brine first passes through the second vehicle indoor heat exchanger HXC2 arranged at the downstream-side location in the air duct AD, and subsequently passes through the first vehicle indoor heat exchanger HXC1 arranged at the upstream-side location in the air duct AD. Thus, heat exchange between brine and air is of the so-called countercurrent type. In any heat exchanger, a great temperature difference between brine and air can be ensured, and therefore, cooling of air, i.e., air-cooling, can be efficiently performed.

Note that in a case where the temperature of brine circulating in the low-temperature brine circuit BCC is a high temperature equal to that of air outside the vehicle compartment, such as right after the engine (or the electric drive system) of the vehicle has been started during the summer time, the compressor CP of the heat pump unit HP is preferably rotated at as high speed as possible for accelerating a decrease in the brine temperature. Note that in a case where noise of the compressor CP provides an uncomfortable feeling in the vehicle compartment specifically at a low vehicle speed, the upper limit of the number of rotations of the compressor CP may be set.

On the other hand, in a case where the temperature of brine circulating in the low-temperature brine circuit BCC has decreased to equal to or lower than a predetermined upper temperature limit (such a temperature that the air-cooling effect can be maintained for the desired time by the cold storage amount of brine), the compressor CP of the heat pump unit HP may be stopped upon idling of the vehicle for reducing energy consumption.

The same control mode of the compressor CP of the heat pump unit HP as described above also applies to the dehumidification air-cooling mode described next and an air-cooling mode and a dehumidification air-cooling mode in the vehicle air-conditioning systems of the other embodiments described later.

In the dehumidification air-cooling mode, the on-off valves V3 to V5 are opened, and on the other hand, the on-off valves V1, V2 are closed, as illustrated in FIG. 2(D).

As a result, brine circulating in the low-temperature brine circuit BCC flows into the first vehicle indoor heat exchanger HXC1 from the low-temperature-side pump PC sequentially through the on-off valve V3 and the on-off valve V5, and cools air flowing in the air duct AD. At this point, the air flowing in the air duct AD is cooled to equal to or lower than the dew-point temperature, and contained moisture is condensed and removed and the air is dehumidified.

Thereafter, the brine having flowed out of the first vehicle indoor heat exchanger HXC1 flows into the evaporator EV of the heat pump unit HP through the three-way valve TV5. After having been cooled by evaporation heat of refrigerant, the brine flows out of the evaporator EV, and flows back to the low-temperature-side pump PC.

Meanwhile, brine circulating in the high-temperature brine circuit BCH flows into the second vehicle indoor heat exchanger HXC2 from the high-temperature-side pump PH sequentially through the three-way valve TV1 and the on-off valve V4, and heats air flowing in the air duct AD.

The brine having flowed out of the second vehicle indoor heat exchanger HXC2 flows into the vehicle outdoor heat exchanger HXE sequentially through the three-way valve TV2 and the three-way valve TV6, and releases heat to air outside the vehicle compartment. Thereafter, the brine having flowed out of the vehicle outdoor heat exchanger HXE flows into the condenser CD of the heat pump unit HP sequentially through the three-way valve TV4 and the three-way valve TV3. After having been heated by condensation heat of refrigerant, the brine flows out of the condenser CD, and flows back to the high-temperature-side pump PH.

As described above, air flowing in the air duct AD is dehumidified in the first vehicle indoor heat exchanger HXC1 through which low-temperature brine passes, and thereafter, is heated to a desired temperature in the second vehicle indoor heat exchanger HXC2 through which high-temperature brine passes. In this manner, dehumidification air-cooling is performed.

In the defrosting mode, the settings of opening/closing of the on-off valves V1 to V5 and the settings of paths of the low-temperature brine circuit BCC and the high-temperature brine circuit BCH are similar to those in the dehumidification air-cooling mode as illustrated in FIG. 2(D).

Note that in the defrosting mode, brine circulating in the high-temperature brine circuit BCH flows out of the second vehicle indoor heat exchanger HXC2. Thereafter, the brine does not flow into the first vehicle indoor heat exchanger HXC1 as in the air-heating mode, but is introduced into the vehicle outdoor heat exchanger HXE. In this manner, the vehicle outdoor heat exchanger HXE is defrosted.

Moreover, in the defrosting mode, the first vehicle indoor heat exchanger HXC1 is utilized as a heat absorption source of brine circulating in the low-temperature brine circuit BCC instead of the vehicle outdoor heat exchanger HXE (a heat absorption source in the air-heating mode) which cannot be utilized because the vehicle outdoor heat exchanger HXE is a defrosting target.

As described above, in the defrosting mode, brine circulating in the high-temperature brine circuit BCH is also introduced into the second vehicle indoor heat exchanger HXC2 so that air flowing in the air duct AD can be heated. Thus, degradation of the air-heating effect can be reduced as compared to the air-heating mode.

Note that operation in the defrosting mode is preferably performed upon stop of the vehicle, considering that the vehicle outdoor heat exchanger HXE can be most efficiently defrosted upon stop of the vehicle. With a sufficient brine filling amount, defrosting can be performed utilizing only the heat storage amount of brine. Thus, the compressor CP of the heat pump unit HP is stopped when operation in the defrosting mode is performed so that energy consumption can be reduced.

Figure 3:
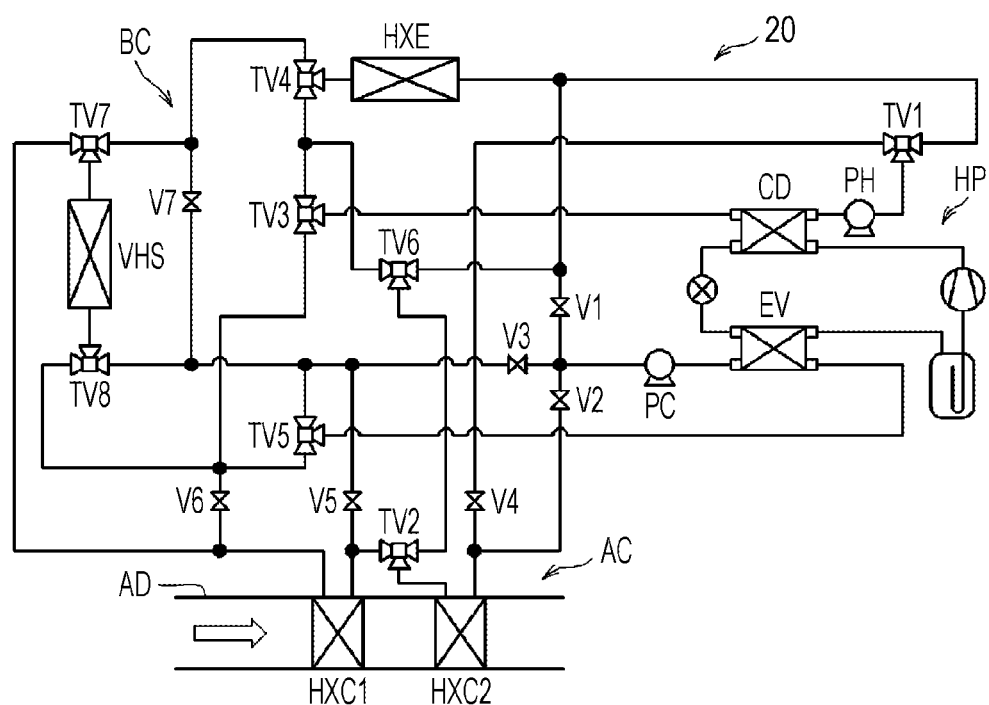
FIG. 3 illustrates a conceptual diagram for describing an entire configuration of a vehicle air-conditioning system of a second embodiment of the present invention.

FIG. 3 illustrates a schematic diagram for describing an entire configuration of a vehicle air-conditioning system 20 of a second embodiment of the present invention.

As illustrated in FIG. 3, in the vehicle air-conditioning system 20 of the second embodiment, multiple flow paths, three-way valves TV7 to TV8 configured as three-way valves, and on-off valves V6 to V7 are added to a brine flow path network BC so that a vehicle-side heat source VHS can be utilized as a heat absorption source of brine circulating in the brine flow path network BC of the vehicle air-conditioning system 10 of the first embodiment. Other configurations are the same as those of the vehicle air-conditioning system 10 of the first embodiment, and therefore, overlapping description will be omitted.

For example, waste heat of a battery mounted on a vehicle can be utilized as the vehicle-side heat source VHS. Hereinafter, description will be made assuming that the vehicle-side heat source VHS is the battery mounted on the vehicle.

The vehicle air-conditioning system 20 configured as described above controls, as necessary, the multiple flow path switching valves arranged on the brine flow path network BC to form a high-temperature brine circuit BCH and a low-temperature brine circuit BCC in each mode, thereby performing operation in six modes (an air-heating mode, a dehumidification air-heating mode, an air-cooling mode, a dehumidification air-cooling mode, a defrosting mode, and an air-heating mode accompanied by battery heating).

Figure 4:
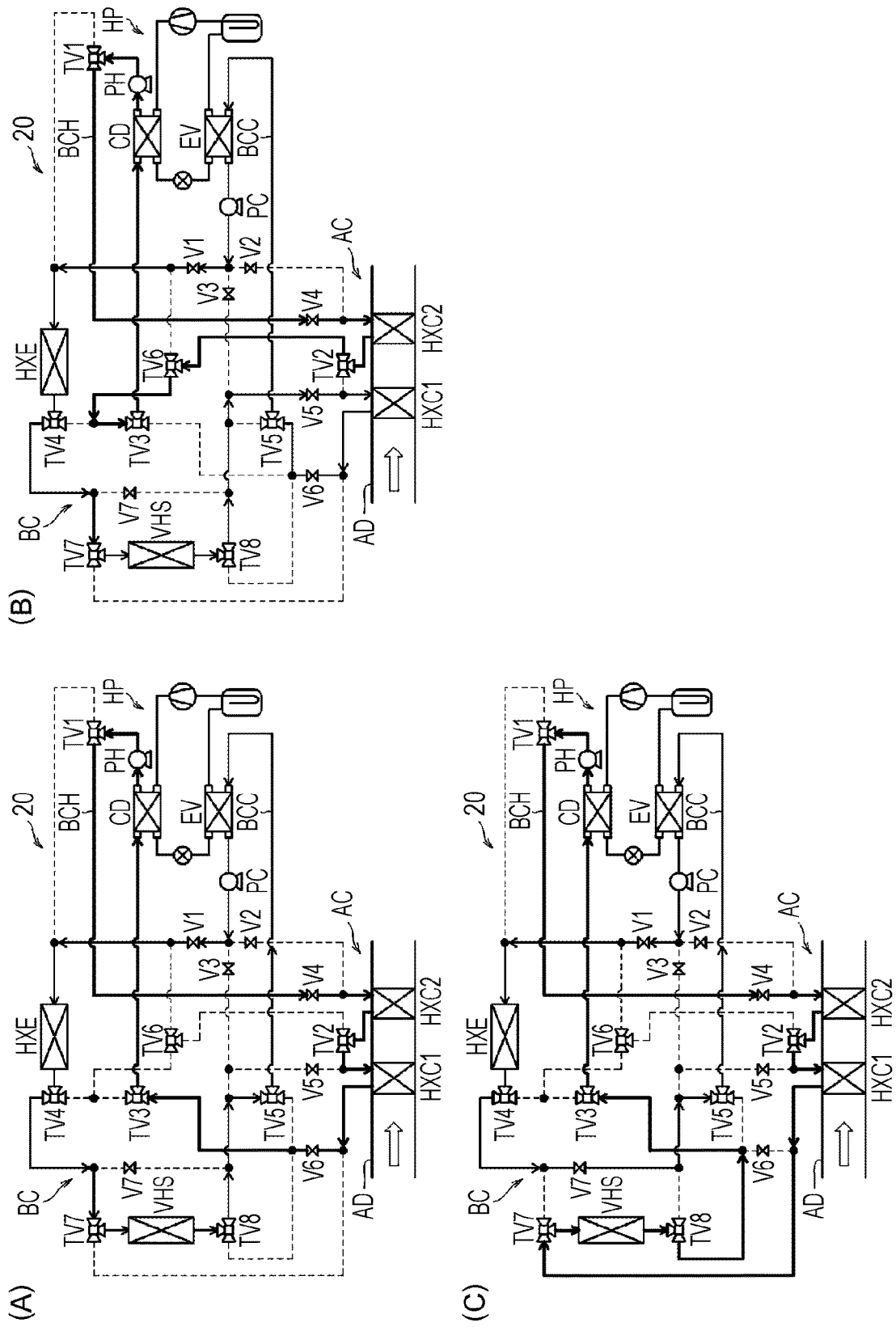
FIG. 4 illustrates conceptual diagrams for describing the flow of brine in operation modes of the vehicle air-conditioning system of the second embodiment of the present invention accompanied by air-heating, FIG. 4(A) illustrating an air-heating mode, FIG. 4(B) illustrating a dehumidification air-heating mode, and FIG. 4(C) illustrating an air-heating mode accompanied by battery heating.
Figure 5:
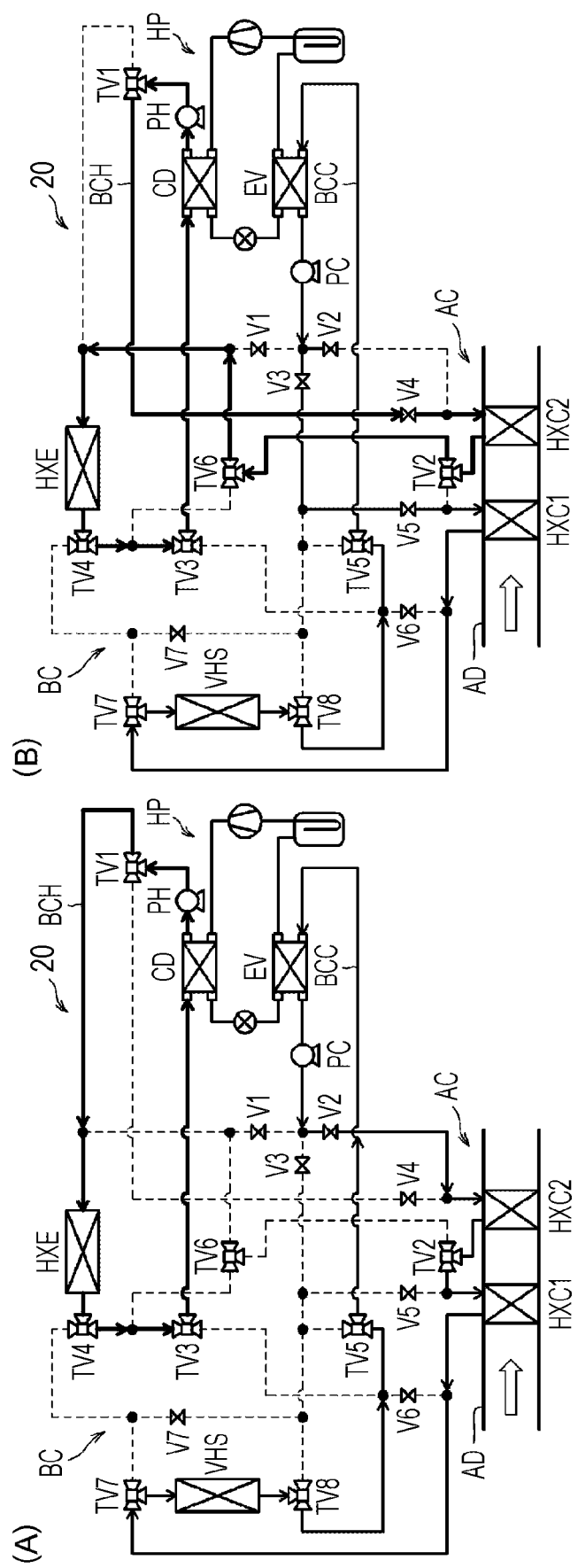
FIG. 5 illustrates conceptual diagrams for describing the flow of brine in operation modes of the vehicle air-conditioning system of the second embodiment of the present invention accompanied by air-cooling, FIG. 5(A) illustrating an air-cooling mode and FIG. 5(B) illustrating a dehumidification air-cooling mode and a defrosting mode.

FIG. 4 illustrates schematic diagrams for describing the flow of brine in the operation modes of the vehicle air-conditioning system 20 accompanied by air-heating, FIG. 4(A) illustrating the air-heating mode, FIG. 4(B) illustrating the dehumidification air-heating mode, and FIG. 4(C) illustrating the air-heating mode accompanied by battery heating. Moreover, FIG. 5 illustrates schematic diagrams for describing the flow of brine in the operation modes of the vehicle air-conditioning system 20 accompanied by air-cooling, FIG. 5(A) illustrating the air-cooling mode and FIG. 5(B) illustrating the dehumidification air-cooling mode and the defrosting mode.

In the air-heating mode, the on-off valves V1, V4, V6 are opened, and on the other hand, the on-off valves V2, V3, V5, V7 are closed, as illustrated in FIG. 4(A).

As a result, brine circulating in the high-temperature brine circuit BCH flows into a second vehicle indoor heat exchanger HXC2 from a high-temperature-side pump PH sequentially through a three-way valve TV1 and the on-off valve V4, and further flows into a first vehicle indoor heat exchanger HXC1 through a three-way valve TV2.

At this point, the brine passing sequentially through the second vehicle indoor heat exchanger HXC2 and the first vehicle indoor heat exchanger HXC1 sequentially heats air flowing in an air duct AD.

The brine having flowed out of the first vehicle indoor heat exchanger HXC1 flows into a condenser CD of a heat pump unit HP sequentially through the on-off valve V6 and a three-way valve TV3. After having been heated by condensation heat of refrigerant, the brine flows out of the condenser CD, and flows back to the high-temperature-side pump PH.

Meanwhile, brine circulating in the low-temperature brine circuit BCC flows into a vehicle outdoor heat exchanger HXE from a low-temperature-side pump PC through the on-off valve V1, and absorbs heat from air outside a vehicle compartment. Thereafter, the brine having flowed out of the vehicle outdoor heat exchanger HXE flows into the battery VHS sequentially through a three-way valve TV4 and the three-way valve TV7, and absorbs waste heat of the battery VHS. Thereafter, the brine having flowed out of the battery VHS flows into an evaporator EV of the heat pump unit HP sequentially through the three-way valve TV8 and a three-way valve TV5. After having been cooled by evaporation heat of refrigerant, the brine flows out of the evaporator EV, and flows back to the low-temperature-side pump PC.

As described above, in the air-heating mode of the vehicle air-conditioning system 20 of the second embodiment, the battery VHS can be utilized in addition to the vehicle outdoor heat exchanger HXE as the heat absorption source of brine circulating in the low-temperature brine circuit BCC, and therefore, air-heating can be more efficiently performed as compared to the air-heating mode of the vehicle air-conditioning system 10 of the first embodiment. Moreover, brine circulating in the low-temperature brine circuit BCC flows so that the battery VHS can be cooled.

In the dehumidification air-heating mode, the on-off valves V1, V4 to V6 are opened, and on the other hand, the on-off valves V2, V3, V7 are closed, as illustrated in FIG. 4(B).

As a result, brine circulating in the high-temperature brine circuit BCH flows into the second vehicle indoor heat exchanger HXC2 from the high-temperature-side pump PH sequentially through the three-way valve TV1 and the on-off valve V4, and heats air flowing in the air duct AD.

The brine having flowed out of the second vehicle indoor heat exchanger HXC2 flows into the condenser CD of the heat pump unit HP sequentially through the three-way valve TV2, a three-way valve TV6, and the three-way valve TV3. After having been heated by condensation heat of refrigerant, the brine flows out of the condenser CD, and flows back to the high-temperature-side pump PH.

Meanwhile, brine circulating in the low-temperature brine circuit BCC flows into the vehicle outdoor heat exchanger HXE from the low-temperature-side pump PC through the on-off valve V1, and absorbs heat from air outside the vehicle compartment. Thereafter, the brine having flowed out of the vehicle outdoor heat exchanger HXE flows into the battery VHS sequentially through the three-way valve TV4 and the three-way valve TV7, and absorbs waste heat of the battery VHS. Thereafter, the brine having flowed out of the battery VHS flows into the first vehicle indoor heat exchanger HXC1 sequentially through the three-way valve TV8 and the on-off valve V5, and cools air flowing in the air duct AD. At this point, the air in the air duct AD is cooled to equal to or lower than a dew-point temperature, and contained moisture is condensed and removed and the air is dehumidified.

Thereafter, the brine having flowed out of the first vehicle indoor heat exchanger HXC1 flows into the evaporator EV of the heat pump unit HP sequentially through the on-off valve V6 and the three-way valve TV5. After having been cooled by evaporation heat of refrigerant, the brine flows out of the evaporator EV, and flows back to the low-temperature-side pump PC.

As described above, air flowing in the air duct AD is dehumidified in the first vehicle indoor heat exchanger HXC1 through which low-temperature brine passes, and thereafter, is heated to a desired temperature in the second vehicle indoor heat exchanger HXC2 through which high-temperature brine passes. In this manner, dehumidification air-heating is performed.

In the air-heating mode accompanied by battery heating, the on-off valves V1, V4, V7 are opened, and on the other hand, the on-off valves V2, V3, V5, V6 are closed, as illustrated in FIG. 4(C).

As a result, brine circulating in the high-temperature brine circuit BCH flows into the second vehicle indoor heat exchanger HXC2 from the high-temperature-side pump PH sequentially through the three-way valve TV1 and the on-off valve V4, and further flows into the first vehicle indoor heat exchanger HXC1 through the three-way valve TV2.

At this point, the brine passing sequentially through the second vehicle indoor heat exchanger HXC2 and the first vehicle indoor heat exchanger HXC1 sequentially heats air flowing in the air duct AD.

The brine having flowed out of the first vehicle indoor heat exchanger HXC1 flows into the battery VHS through the three-way valve TV7. However, the batter VHS is at a low temperature in environment where operation in this mode is performed, and therefore, the battery VHS is heated by the brine. Thereafter, the brine having flowed out of the battery VHS flows into the condenser CD of the heat pump unit HP sequentially through the three-way valve TV8 and the three-way valve TV3. After having been heated by condensation heat of refrigerant, the brine flows out of the condenser CD, and flows back to the high-temperature-side pump PH.

Meanwhile, brine circulating in the low-temperature brine circuit BCC flows into the vehicle outdoor heat exchanger HXE from the low-temperature-side pump PC through the on-off valve V1, and absorbs heat from air outside the vehicle compartment. Thereafter, the brine having flowed out of the vehicle outdoor heat exchanger HXE flows into the evaporator EV of the heat pump unit HP sequentially through the three-way valve TV4, the on-off valve V7, and the three-way valve TV5. After having been cooled by evaporation heat of refrigerant, the brine flows out of the evaporator EV, and flows back to the low-temperature-side pump PC.

As described above, according to the air-heating mode accompanied by battery heating, in a case where the battery VHS is at a low temperature and performance thereof is degraded, such as right after an engine (or an electric drive system) of the vehicle has been started during the winter time, the inside of the vehicle compartment can be air-heated while the battery VHS is effectively heated.

In the air-cooling mode, the on-off valve V2 is opened, and on the other hand, the on-off valves V1, V3 to V7 are closed, as illustrated in FIG. 5(A).

As a result, brine circulating in the low-temperature brine circuit BCC flows into the second vehicle indoor heat exchanger HXC2 from the low-temperature-side pump PC through the on-off valve V2, and further flows into the first vehicle indoor heat exchanger HXC1 through the three-way valve TV2.

At this point, the brine passing sequentially through the second vehicle indoor heat exchanger HXC2 and the first vehicle indoor heat exchanger HXC1 sequentially cools air flowing in the air duct AD.

The brine having flowed out of the first vehicle indoor heat exchanger HXC1 flows into the battery VHS through the three-way valve TV7, and absorbs waste heat of the battery VHS. Thereafter, the brine having flowed out of the battery VHS flows into the evaporator EV of the heat pump unit HP sequentially through the three-way valve TV8 and the three-way valve TV5. After having been cooled by evaporation heat of refrigerant, the brine flows out of the evaporator EV, and flows back to the low-temperature-side pump PC.

Meanwhile, brine circulating in the high-temperature brine circuit BCH flows into the vehicle outdoor heat exchanger HXE from the high-temperature-side pump PH through the three-way valve TV1, and releases heat to air outside the vehicle compartment. Thereafter, the brine having flowed out of the vehicle outdoor heat exchanger HXE flows into the condenser CD of the heat pump unit HP sequentially through the three-way valve TV4 and the three-way valve TV3. After having been heated by condensation heat of refrigerant, the brine flows out of the condenser CD, and flows back to the high-temperature-side pump PH.

As described above, in the air-cooling mode, low-temperature brine first passes through the second vehicle indoor heat exchanger HXC2 arranged at a downstream-side location in the air duct AD, and subsequently passes through the first vehicle indoor heat exchanger HXC1 arranged at an upstream-side location in the air duct AD. Thus, heat exchange between brine and air is of a so-called counter-current type. In any heat exchanger, a great temperature difference between brine and air can be ensured, and therefore, cooling of air, i.e., air-cooling, can be efficiently performed. Further, the battery VHS tending to be at a high temperature in environment where operation in the air-cooling mode is performed can be also effectively cooled using brine having been provided for cooling air flowing in the air duct AD.

In the dehumidification air-cooling mode, the on-off valves V3 to V5 are opened, and on the other hand, the on-off valves V1, V2, V6, V7 are closed, as illustrated in FIG. 5(B).

As a result, brine circulating in the low-temperature brine circuit BCC flows into the first vehicle indoor heat exchanger HXC1 from the low-temperature-side pump PC sequentially through the on-off valve V3 and the on-off valve V5, and cools air flowing in the air duct AD. At this point, the air in the air duct AD is cooled to equal to or lower than the dew-point temperature, and contained moisture is condensed and removed and the air is dehumidified.

Thereafter, the brine having flowed out of the first vehicle indoor heat exchanger HXC1 flows into the battery VHS through the three-way valve TV7, and absorbs waste heat of the battery VHS. Thereafter, the brine having flowed out of the battery VHS flows into the evaporator EV of the heat pump unit HP sequentially through the three-way valve TV8 and the three-way valve TV5. After having been cooled by evaporation heat of refrigerant, the brine flows out of the evaporator EV, and flows back to the low-temperature-side pump PC.

Meanwhile, brine circulating in the high-temperature brine circuit BCH flows into the second vehicle indoor heat exchanger HXC2 from the high-temperature-side pump PH sequentially through the three-way valve TV1 and the on-off valve V4, and heats air flowing in the air duct AD.

The brine having flowed out of the second vehicle indoor heat exchanger HXC2 flows into the vehicle outdoor heat exchanger HXE sequentially through the three-way valve TV2 and the three-way valve TV6, and releases heat to air outside the vehicle compartment. Thereafter, the brine having flowed out of the vehicle outdoor heat exchanger HXE flows into the condenser CD of the heat pump unit HP sequentially through the three-way valve TV4 and the three-way valve TV3. After having been heated by condensation heat of refrigerant, the brine flows out of the condenser CD, and flows back to the high-temperature-side pump PH.

As described above, air flowing in the air duct AD is dehumidified in the first vehicle indoor heat exchanger HXC1 through which low-temperature brine passes, and thereafter, is heated to a desired temperature in the second vehicle indoor heat exchanger HXC2 through which high-temperature brine passes. In this manner, dehumidification air-cooling is performed. Using the brine having been provided for dehumidifying the air flowing in the air duct AD, the battery VHS tending to be at a high temperature in environment where operation in the dehumidification air-cooling mode is performed can be also effectively cooled.

In the defrosting mode, the settings of the flow path switching valves and the settings of paths of the low-temperature brine circuit BCC and the high-temperature brine circuit BCH are similar to those in the dehumidification air-cooling mode as illustrated in FIG. 5(B).

Note that in the defrosting mode, brine circulating in the high-temperature brine circuit BCH flows out of the second vehicle indoor heat exchanger HXC2. Thereafter, the brine does not flow into the first vehicle indoor heat exchanger HXC1 as in the air-heating mode, but is introduced into the vehicle outdoor heat exchanger HXE. In this manner, the vehicle outdoor heat exchanger HXE is defrosted.

Moreover, in the defrosting mode, the first vehicle indoor heat exchanger HXC1 and the battery VHS are utilized as a heat absorption source of brine circulating in the low-temperature brine circuit BCC instead of the vehicle outdoor heat exchanger HXE (a heat absorption source in the air-heating mode) which cannot be utilized because the vehicle outdoor heat exchanger HXE is a defrosting target. Note that at this point, the battery VHS can be bypassed in a case where the temperature of the battery VHS is low (a case where performance of the battery is degraded).

As described above, in the defrosting mode, brine circulating in the high-temperature brine circuit BCH is also introduced into the second vehicle indoor heat exchanger HXC2 so that air flowing in the air duct AD can be heated. Thus, degradation of an air-heating effect can be reduced as compared to the air-heating mode.

Figure 6:
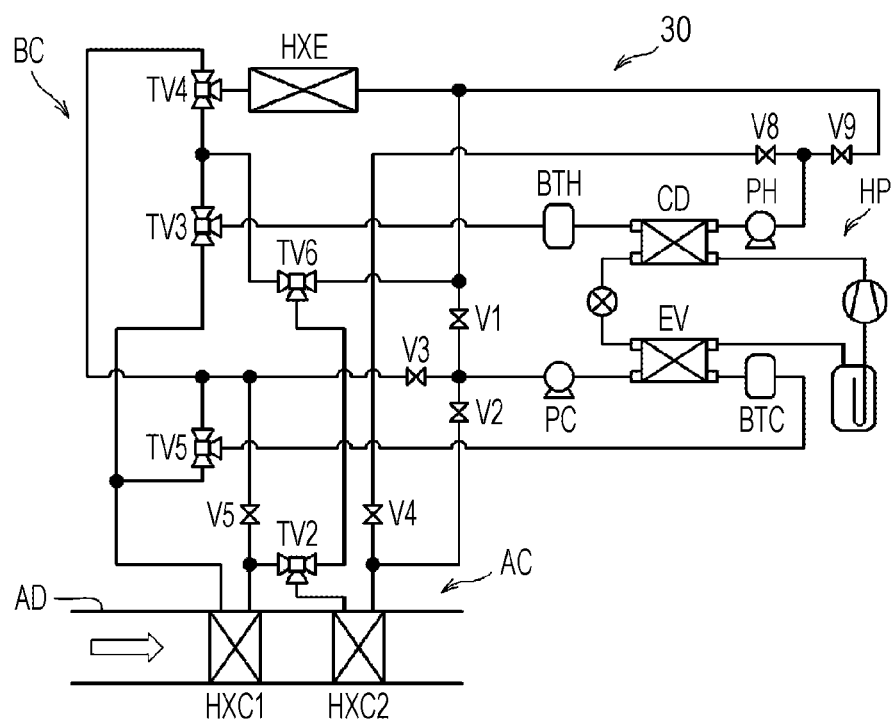
FIG. 6 illustrates a conceptual diagram for describing an entire configuration of a vehicle air-conditioning system of a third embodiment of the present invention.

FIG. 6 illustrates a schematic diagram for describing an entire configuration of a vehicle air-conditioning system 30 of a third embodiment of the present invention.

As illustrated in FIG. 6, in the vehicle air-conditioning system 30 of the third embodiment, a high-temperature-side buffer tank BTH is placed on an upstream side of a condenser CD of a heat pump unit HP on the brine flow path network BC of the vehicle air-conditioning system 10 of the first embodiment, and a low-temperature-side buffer tank BTC is placed on an upstream side of an evaporator EV of the heat pump unit HP on the brine flow path network BC of the vehicle air-conditioning system 10 of the first embodiment. In addition, a three-way valve TV1 is omitted, and on-off valves V8, V9 are each placed on branched paths on a downstream side of the three-way valve TV1. Other configurations are the same as those of the vehicle air-conditioning system 10 of the first embodiment, and therefore, overlapping description will be omitted.

The vehicle air-conditioning system 30 configured as described above controls, as necessary, the multiple flow path switching valves arranged on the brine flow path network BC to form a high-temperature brine circuit BCH and a low-temperature brine circuit BCC in each mode, thereby performing operation in seven modes (an air-heating mode, a dehumidification air-heating mode, an air-cooling mode, a dehumidification air-cooling mode, a defrosting mode, an air-heating mode accompanied by brine amount adjustment, and an air-cooling mode accompanied by brine amount adjustment).

Figure 7:
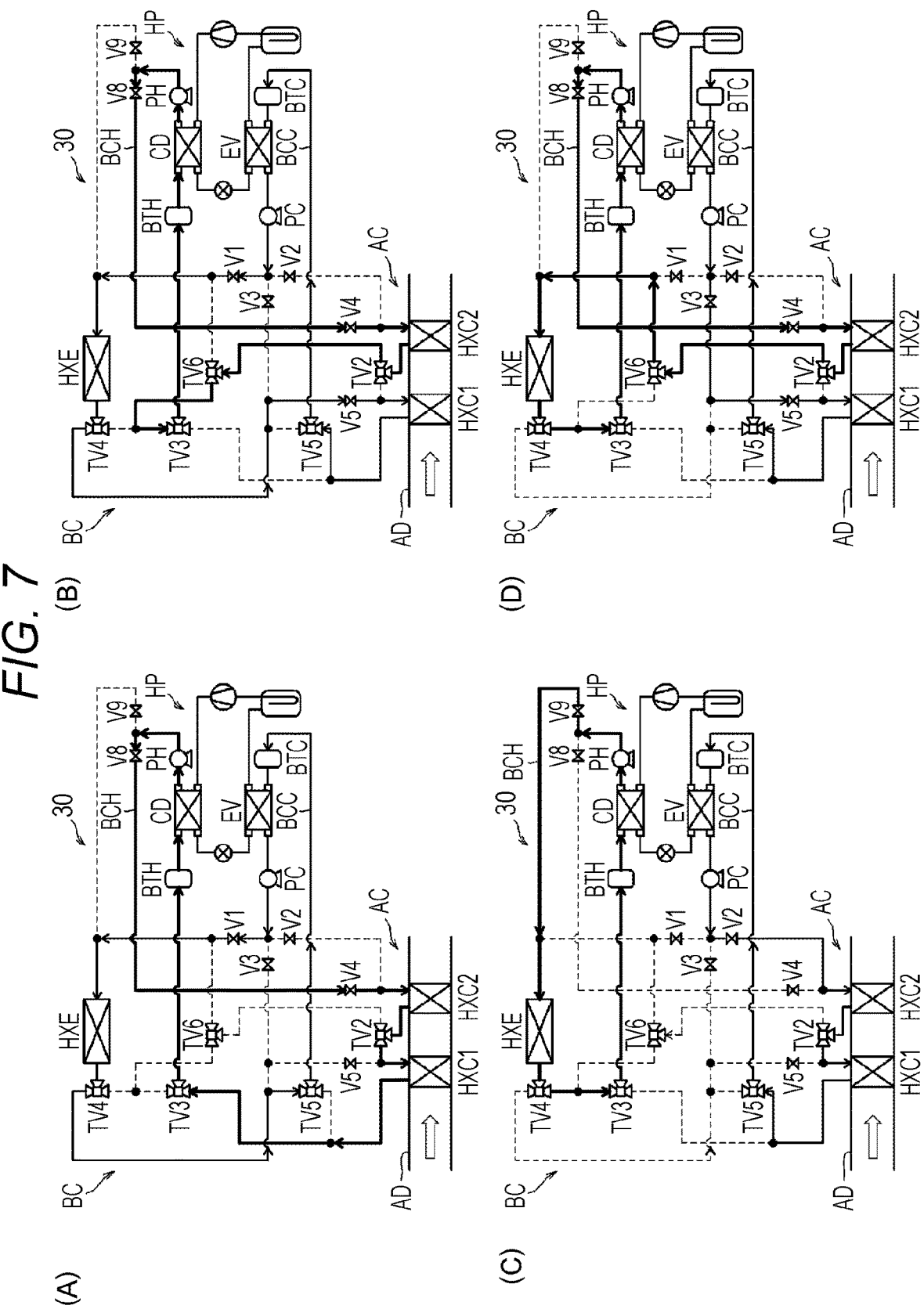
FIG. 7 illustrates conceptual diagrams for describing the flow of brine in each operation mode of the vehicle air-conditioning system of the third embodiment of the present invention, FIG. 7(A) illustrating an air-heating mode, FIG. 7(B) illustrating a dehumidification air-heating mode, FIG. 7(C) illustrating an air-cooling mode, and FIG. 7(D) illustrating a dehumidification air-cooling mode and a defrosting mode.

FIG. 7 illustrates schematic diagrams for describing the flow of brine in each operation mode of the vehicle air-conditioning system 30, FIG. 7(A) illustrating the air-heating mode, FIG. 7(B) illustrating the dehumidification air-heating mode, FIG. 7(C) illustrating the air-cooling mode, and FIG. 7(D) illustrating the dehumidification air-cooling mode and the defrosting mode.

In the air-heating mode, the on-off valves V1, V4, V8 are opened, and on the other hand, the on-off valves V2, V3, V5, V9 are closed, as illustrated in FIG. 7(A).

The flow of brine in the high-temperature brine circuit BCH in the air-heating mode of the vehicle air-conditioning system 30 of the third embodiment is different from that in the air-heating mode of the vehicle air-conditioning system 10 of the first embodiment, except only that brine passes sequentially through the on-off valve V8 and the on-off valve V4 when flowing from a high-temperature-side pump PH to a second vehicle indoor heat exchanger HXC2 and that brine passes through the high-temperature-side buffer tank BTH in the middle of flowing from a three-way valve TV3 to the condenser CD of the heat pump unit HP.

Moreover, the flow of brine in the low-temperature brine circuit BCC in the air-heating mode of the vehicle air-conditioning system 30 of the third embodiment is different from that in the air-heating mode of the vehicle air-conditioning system 10 of the first embodiment, except only that brine passes through the low-temperature-side buffer tank BTC in the middle of flowing from a three-way valve TV5 to the evaporator EV of the heat pump unit HP.

Thus, in the air-heating mode of the vehicle air-conditioning system 30 of the third embodiment, air-heating can be also efficiently performed as in the air-heating mode of the vehicle air-conditioning system 10 of the first embodiment.

In the dehumidification air-heating mode, the on-off valves V1, V4, V5, V8 are opened, and on the other hand, the on-off valves V2, V3, V9 are closed, as illustrated in FIG. 7(B).

The flow of brine in the high-temperature brine circuit BCH in the dehumidification air-heating mode of the vehicle air-conditioning system 30 of the third embodiment is different from that in the dehumidification air-heating mode of the vehicle air-conditioning system 10 of the first embodiment, except only that brine passes sequentially through the on-off valve V8 and the on-off valve V4 when flowing from the high-temperature-side pump PH to the second vehicle indoor heat exchanger HXC2 and that brine passes through the high-temperature-side buffer tank BTH in the middle of flowing from the three-way valve TV3 to the condenser CD of the heat pump unit HP.

Moreover, the flow of brine in the low-temperature brine circuit BCC in the dehumidification air-heating mode of the vehicle air-conditioning system 30 of the third embodiment is different from that in the dehumidification air-heating mode of the vehicle air-conditioning system 10 of the first embodiment, except only that brine passes through the low-temperature-side buffer tank BTC in the middle of flowing from the three-way valve TV5 to the evaporator EV of the heat pump unit HP.

Thus, in the vehicle air-conditioning system 30 of the third embodiment, dehumidification air-heating is also performed as in the vehicle air-conditioning system 10 of the first embodiment.

In the air-cooling mode, the on-off valves V2, V9 are opened, and on the other hand, the on-off valves V1, V3 to V5, V8 are closed, as illustrated in FIG. 7(C).

The flow of brine in the low-temperature brine circuit BCC in the air-cooling mode of the vehicle air-conditioning system 30 of the third embodiment is different from that in the air-cooling mode of the vehicle air-conditioning system 10 of the first embodiment, except only that brine passes through the low-temperature-side buffer tank BTC in the middle of flowing from the three-way valve TV5 to the evaporator EV of the heat pump unit HP.

Moreover, the flow of brine in the high-temperature brine circuit BCH in the air-cooling mode of the vehicle air-conditioning system 30 of the third embodiment is different from that in the air-cooling mode of the vehicle air-conditioning system 10 of the first embodiment, except only that brine passes through the on-off valve V9 when flowing from the high-temperature-side pump PH to a vehicle outdoor heat exchanger HXE and that brine passes through the high-temperature-side buffer tank BTH in the middle of flowing from the three-way valve TV3 to the condenser CD of the heat pump unit HP.

Thus, in the air-cooling mode of the vehicle air-conditioning system 30 of the third embodiment, air-cooling can be also efficiently performed as in the air-cooling mode of the vehicle air-conditioning system 10 of the first embodiment.

In the dehumidification air-cooling mode and the defrosting mode, the on-off valves V3 to V5, V8 are opened, and on the other hand, the on-off valves V1, V2, V9 are closed, as illustrated in FIG. 7(D).

The flow of brine in the low-temperature brine circuit BCC in the dehumidification air-cooling mode and the defrosting mode of the vehicle air-conditioning system 30 of the third embodiment is different from that in the dehumidification air-cooling mode and the defrosting mode of the vehicle air-conditioning system 10 of the first embodiment, except only that brine passes through the low-temperature-side buffer tank BTC in the middle of flowing from the three-way valve TV5 to the evaporator EV of the heat pump unit HP.

Moreover, the flow of brine in the high-temperature brine circuit BCH in the dehumidification air-cooling mode and the defrosting mode of the vehicle air-conditioning system 30 of the third embodiment is different from that in the dehumidification air-cooling mode and the defrosting mode of the vehicle air-conditioning system 10 of the first embodiment, except only that brine passes sequentially through the on-off valve V8 and the on-off valve V4 when flowing from the high-temperature-side pump PH to the second vehicle indoor heat exchanger HXC2 and that brine passes through the high-temperature-side buffer tank BTH in the middle of flowing from the three-way valve TV3 to the condenser CD of the heat pump unit HP.

Thus, in the vehicle air-conditioning system 30 of the third embodiment, dehumidification air-cooling can be also performed as in the vehicle air-conditioning system 10 of the first embodiment, and defrosting can be also performed while degradation of an air-heating effect is reduced as compared to the air-heating mode.

As described above, the vehicle air-conditioning system 30 of the third embodiment is actuated as in the vehicle air-conditioning system 10 of the first embodiment in the (normal) air-heating mode, the dehumidification air-heating mode, the (normal) air-cooling mode, the dehumidification air-cooling mode, and the defrosting mode. However, in the vehicle air-conditioning system 30 brine is transferred between the high-temperature brine circuit BCH and the low-temperature brine circuit BCC in the air-heating mode accompanied by brine amount adjustment and the air-cooling mode accompanied by brine amount adjustment as described below.

Figure 8:
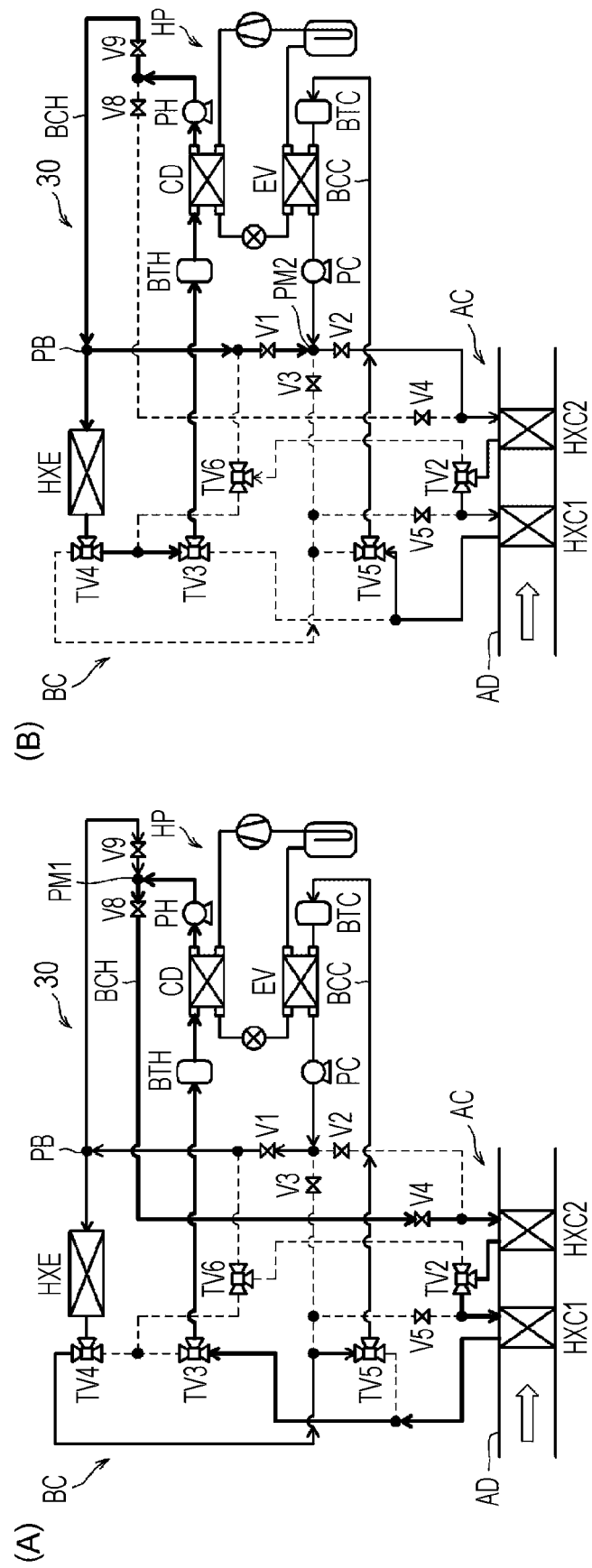
FIG. 8 illustrates conceptual diagrams for describing the flow of brine in an operation mode of the vehicle air-conditioning system of the third embodiment of the present invention accompanied by brine amount adjustment, FIG. 8(A) illustrating an air-heating mode accompanied by brine amount adjustment and FIG. 8(B) illustrating an air-cooling mode accompanied by brine amount adjustment.

FIG. 8 illustrates conceptual diagrams for describing the flow of brine in the operation mode of the vehicle air-conditioning system 30 accompanied by brine amount adjustment, FIG. 8(A) illustrating the air-heating mode accompanied by brine amount adjustment and FIG. 8(B) illustrating the air-cooling mode accompanied by brine amount adjustment.

The settings of paths of the high-temperature brine circuit BCH and the low-temperature brine circuit BCC in the air-heating mode accompanied by brine amount adjustment are basically similar to the settings of the paths in the normal air-heating mode, but the former is different from the latter in that the on-off valve V9 is opened as illustrated in FIG. 8(A).

The on-off valve V9 is opened, and accordingly, part of brine circulating in the low-temperature brine circuit BCC is transferred from a branching point PB right upstream of the vehicle outdoor heat exchanger HXE through the on-off valve V9 and joins brine circulating in the high-temperature brine circuit BCH at a joint point PM1 between the high-temperature-side pump PH and the on-off valve V8.

As a result, the total amount of brine circulating in the high-temperature brine circuit BCH increases (the total amount of brine circulating in the low-temperature brine circuit BCC decreases), but a brine increment as compared to that in the normal air-heating mode is temporarily stored in the high-temperature-side buffer tank BTH.

As described above, in the air-heating mode accompanied by brine amount adjustment, the total amount of brine circulating in the high-temperature brine circuit BCH increases, and accordingly, the total heat storage amount thereof increases. Thus, even in, e.g., a case where a compressor CP of the heat pump unit HP is stopped upon stop of a vehicle, degradation of the air-heating effect can be reduced by the total heat storage amount of brine circulating in the high-temperature brine circuit BCH.

The settings of the paths of the high-temperature brine circuit BCH and the low-temperature brine circuit BCC in the air-cooling mode accompanied by brine amount adjustment are basically similar to the settings of the paths in the normal air-cooling mode, but the former is different from the latter in that the on-off valve V1 is opened as illustrated in FIG. 8(B).

The on-off valve V1 is opened, and accordingly, part of brine circulating in the high-temperature brine circuit BCH is transferred from the branching point PB right upstream of the vehicle outdoor heat exchanger HXE through the on-off valve V1 and joins brine circulating in the low-temperature brine circuit BCC at a joint point PM2 right downstream of a low-temperature-side pump PC.

As a result, the total amount of brine circulating in the low-temperature brine circuit BCC increases (the total amount of brine circulating in the high-temperature brine circuit BCH decreases), but a brine increment as compared to that in the normal air-cooling mode is temporarily stored in the low-temperature-side buffer tank BTC.

As described above, in the air-cooling mode accompanied by brine amount adjustment, the total amount of brine circulating in the low-temperature brine circuit BCC increases, and accordingly, the total cold storage amount thereof increases. Thus, even in, e.g., a case where the compressor CP of the heat pump unit HP is stopped upon stop of the vehicle, degradation of an air-cooling effect can be reduced by the cold storage amount of brine circulating in the low-temperature brine circuit BCC.

As described above, the vehicle air-conditioning system 30 of the third embodiment is configured to transfer brine as necessary from one brine circuit to another brine circuit in which a great amount of brine needs to circulate. Thus, an excessive brine filling amount across the entirety of the brine flow path network BC can be prevented while a brine heat storage effect or cold storage effect is utilized to a maximum extent.

Figure 9:
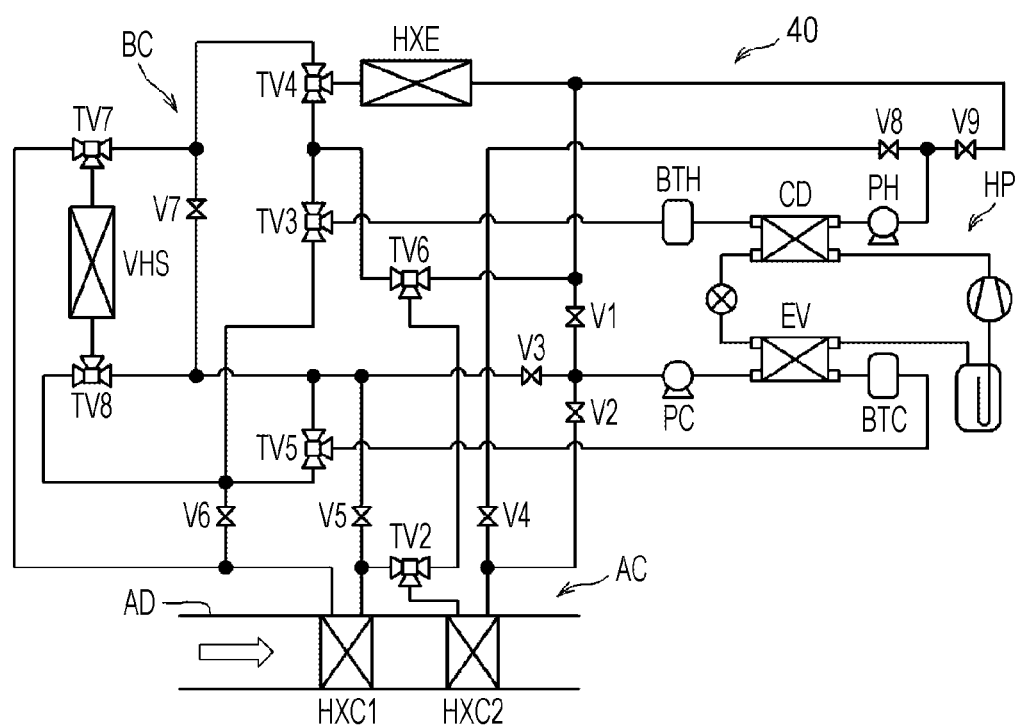
FIG. 9 illustrates a conceptual diagram for describing an entire configuration of a vehicle air-conditioning system of a fourth embodiment of the present invention.
Figure 10:
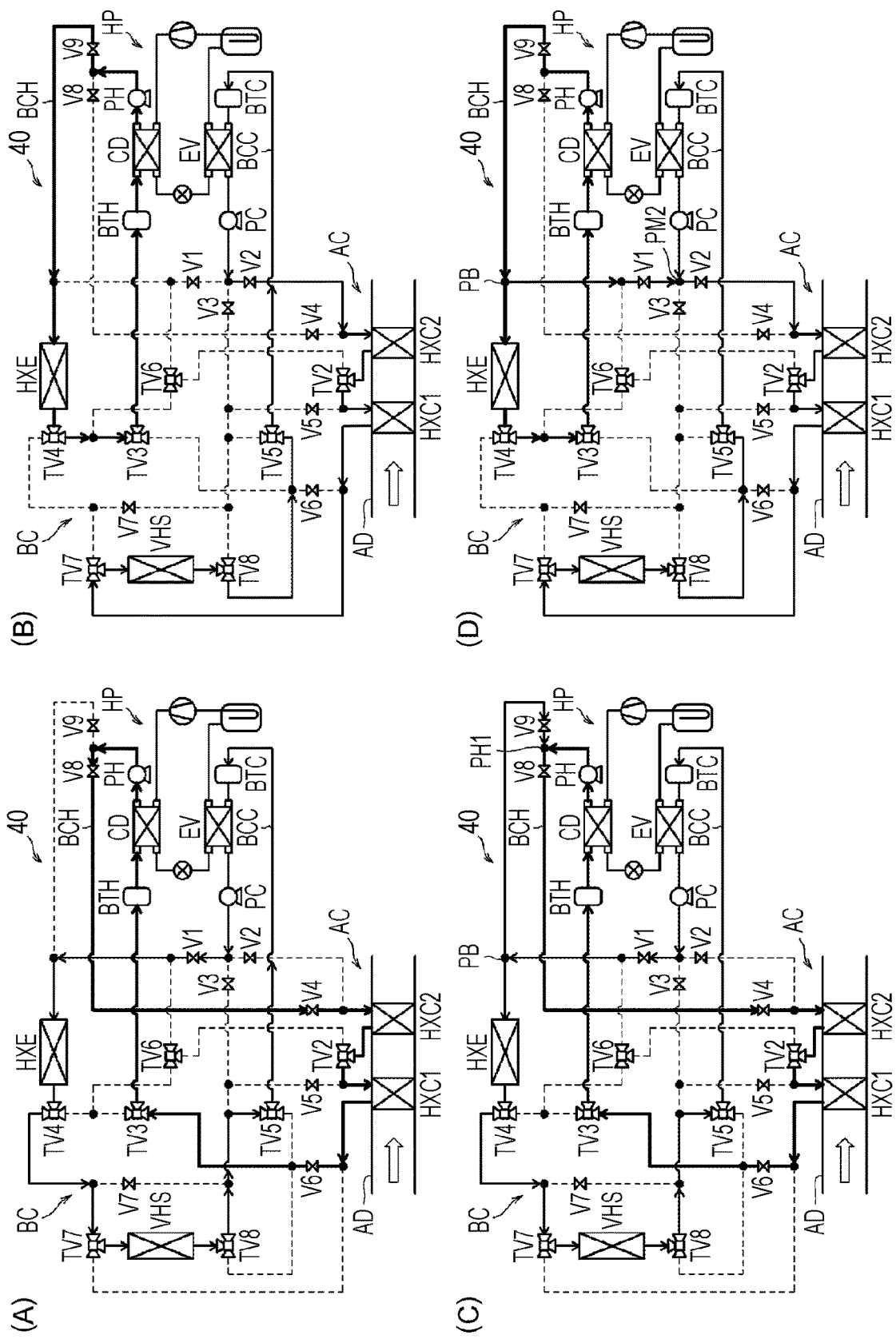
FIG. 10 illustrates conceptual diagrams for describing the flow of brine in each operation mode of the vehicle air-conditioning system of the fourth embodiment of the present invention, FIG. 10(A) illustrating an air-heating mode, FIG. 10(B) illustrating an air-cooling mode, FIG. 10(C) illustrating an air-heating mode accompanied by brine amount adjustment, and FIG. 10(D) illustrating an air-cooling mode accompanied by brine amount adjustment.

FIG. 9 illustrates a schematic diagram for describing an entire configuration of a vehicle air-conditioning system 40 of a fourth embodiment of the present invention.

As illustrated in FIG. 9, the vehicle air-conditioning system 40 of the fourth embodiment employs, in the vehicle air-conditioning system 10 of the first embodiment, a combination of the characteristic (the point that the vehicle-side heat source VHS can be utilized as the heat absorption source of brine circulating in the brine flow path network BC) of the vehicle air-conditioning system 20 of the second embodiment and the characteristic (the point that the high-temperature-side buffer tank BTH and the low-temperature-side buffer tank BTC are provided and brine can be transferred between the high-temperature brine circuit BCH and the low-temperature brine circuit BCC) of the vehicle air-conditioning system 30 of the third embodiment.

The vehicle air-conditioning system 40 configured as described above controls, as necessary, multiple flow path switching valves arranged on the brine flow path network BC to form the high-temperature brine circuit BCH and the low-temperature brine circuit BCC in each mode, thereby performing operation in eight modes (an air-heating mode, a dehumidification air-heating mode, an air-heating mode accompanied by battery heating, an air-cooling mode, a dehumidification air-cooling mode, a defrosting mode, an air-heating mode accompanied by brine amount adjustment, and an air-cooling mode accompanied by brine amount adjustment).

The flows of brine in the air-heating mode, the air-cooling mode, the air-heating mode accompanied by brine amount adjustment, and the air-cooling mode accompanied by brine amount adjustment as representative modes of the above-described modes are each illustrated in FIGS. 10(A), 10(B), 10(C), and 10(D). Note that the flow of brine in each mode is assumed to be obvious from description already made above regarding the flow of brine in each mode of the vehicle air-conditioning systems 10, 20, 30 of the first to third embodiments, and therefore, detailed description will be omitted.

LIST OF THE REFERENCE NUMERALS 10, 20, 30, 40 Vehicle air-conditioning system
AC Vehicle indoor air-conditioning unit
AD Air duct
BC Brine flow path network (heat medium flow path network)
BCC Low-temperature brine circuit (low-temperature heat medium circuit)
BCH High-temperature brine circuit (high-temperature heat medium circuit)
BTC Low-temperature-side buffer tank
BTH High-temperature-side buffer tank
CD Condenser
CP Compressor
EV Evaporator
EX Expansion mechanism
HXC1 First vehicle indoor heat exchanger (vehicle indoor heat exchanger)
HXC2 Second vehicle indoor heat exchanger (vehicle indoor heat exchanger)
HXE Vehicle outdoor heat exchanger
HP Vapor compression heat pump unit
PC Low-temperature-side pump (pump)
PH High-temperature-side pump (pump)
RC Refrigerant circuit
TV1 to TV8 Three-way valve (flow path switching valve)
V1 to V9 On-off valve (flow path switching valve)
VHS Vehicle-side heat source

What is claimed is:

1. A vehicle air-conditioning system comprising:
a vapor compression heat pump unit including at least a compressor, a condenser, an expansion mechanism, and an evaporator on a circuit in which refrigerant flows;
a heat medium flow path network including multiple pumps and multiple flow path switching valves and configured such that a heat medium flows in the heat medium flow path network; and
a vehicle indoor air-conditioning unit including an air duct and multiple vehicle indoor heat exchangers arranged in series in an air flow direction in the air duct and configured to heat or cool air,
wherein the heat medium in the heat medium flow path network exchanges heat with
the refrigerant in each of the condenser and the evaporator,
the air in each of the multiple vehicle indoor heat exchangers, and
vehicle outdoor air in a vehicle outdoor heat exchanger,
when the vehicle air-conditioning system is actuated in an air-cooling mode or an air-heating mode accompanied by neither dehumidification nor defrosting, the heat medium flows in series in the multiple vehicle indoor heat exchangers,
during operation of the vehicle air-conditioning system, a high-temperature heat medium circuit and a low-temperature heat medium circuit of which paths are different according to an operation mode by setting of the multiple flow path switching valves are formed on the heat medium flow path network,
the heat medium circulating in the high-temperature heat medium circuit is heated by the refrigerant in the condenser, and thereafter, is sent to the high-temperature heat medium circuit by a high-temperature-side pump, and
the heat medium circulating in the low-temperature heat medium circuit is cooled by the refrigerant in the evaporator, and thereafter, is sent to the low-temperature heat medium circuit by a low-temperature-side pump.

2. The vehicle air-conditioning system according to claim 1, wherein
a high-temperature-side buffer tank is provided on an upstream side of the condenser on the high-temperature heat medium circuit,
a low-temperature-side buffer tank is provided on an upstream side of the evaporator on the low-temperature heat medium circuit,
when the vehicle air-conditioning system is operated in an air-heating mode, the heat medium is able to be transferred from the low-temperature heat medium circuit to the high-temperature heat medium circuit by setting of the multiple flow path switching valves, and
when the vehicle air-conditioning system is operated in an air-cooling mode, the heat medium is able to be transferred from the high-temperature heat medium circuit to the low-temperature heat medium circuit by setting of the multiple flow path switching valves.

3. The vehicle air-conditioning system according to claim 1, wherein
the vehicle air-conditioning system is configured such that the heat medium flowing in the heat medium flow path network is able to absorb heat from a vehicle-side heat source or release heat to the vehicle-side heat source.

* * * * *

UNITED STATES PATENT AND TRADEMARK OFFICE
CERTIFICATE OF CORRECTION

| | |
|---|---|
| PATENT NO. | : 11,607,926 B2 |
| APPLICATION NO. | : 17/274329 |
| DATED | : March 21, 2023 |
| INVENTOR(S) | : Akira Kaneko |

Page 1 of 1

It is certified that error appears in the above-identified patent and that said Letters Patent is hereby corrected as shown below:

In the Specification

Column 13, Line 3, "the batter VHS is at" should read --the battery VHS is at--.

Signed and Sealed this
Seventeenth Day of September, 2024

*Katherine Kelly Vidal*

Katherine Kelly Vidal
*Director of the United States Patent and Trademark Office*